M. H. CLARK.
MACHINE FOR MAKING RUBBER GOODS.
APPLICATION FILED JAN. 10, 1913.
1,218,983.
Patented Mar. 13, 1917.
15 SHEETS—SHEET 1.
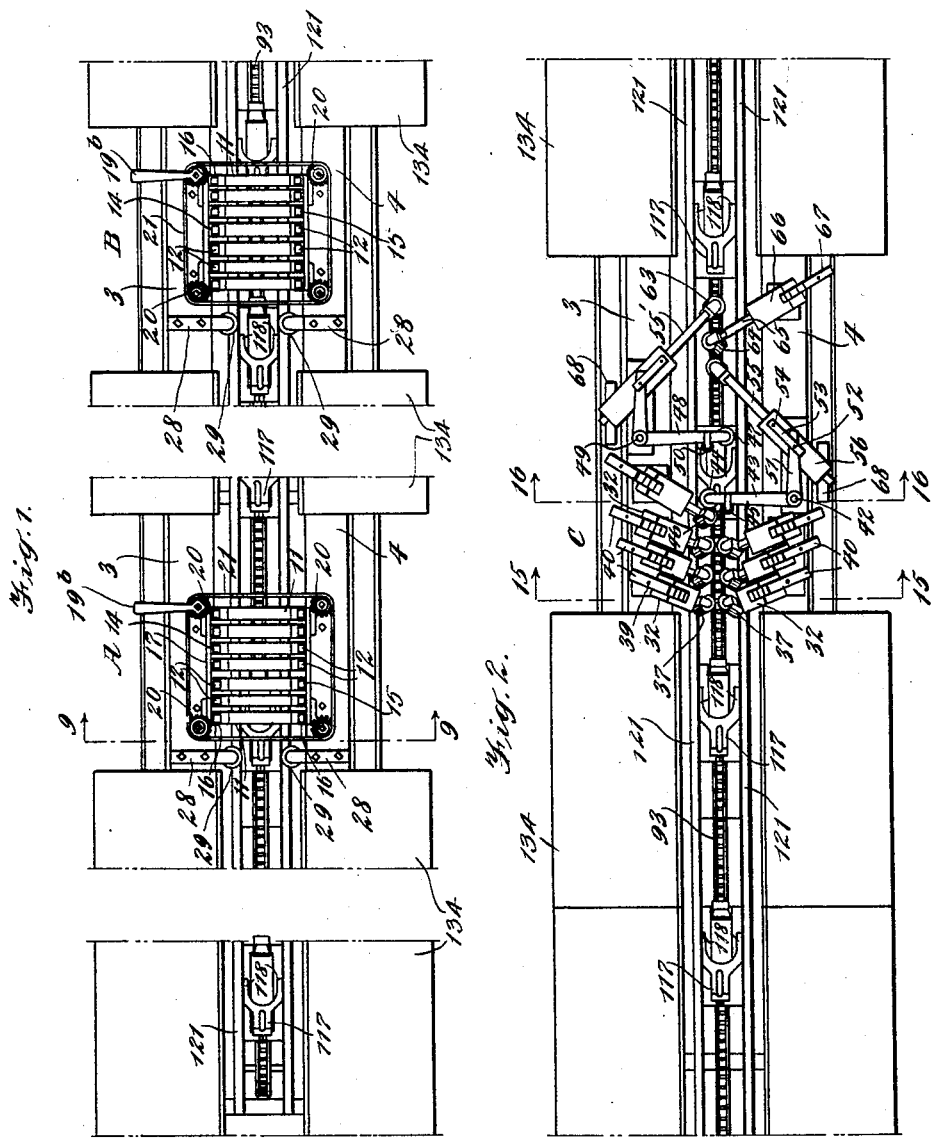
WITNESSES:
Arthur Goat
M. E. McNinch
INVENTOR.
Myron H. Clark
BY Gifford Bull
his ATTORNEYS M. H. CLARK.
MACHINE FOR MAKING RUBBER GOODS.
APPLICATION FILED JAN. 10, 1913.
1,218,983.
Patented Mar. 13, 1917.
15 SHEETS—SHEET 2.
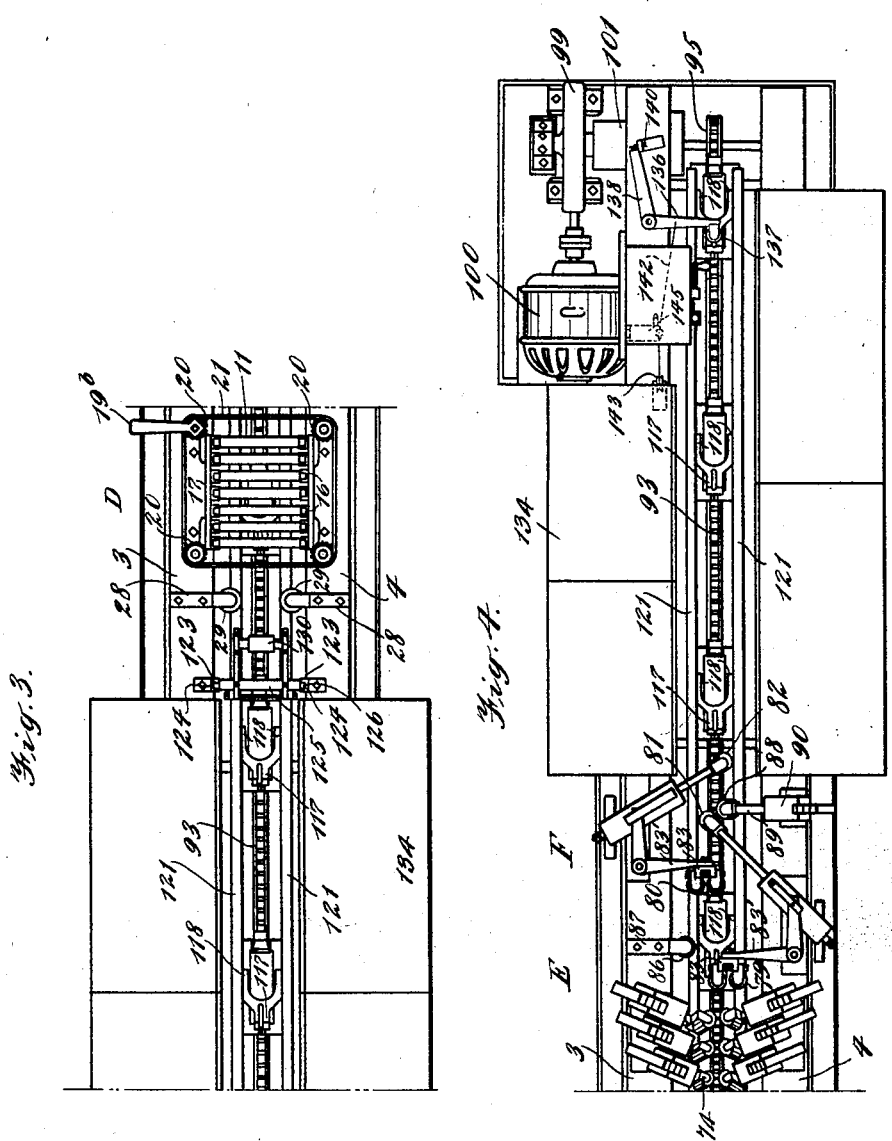
WITNESSES:
Arthur Goat
M. E. McNinch
INVENTOR.
Myron H. Clark
BY
Gifford Bull
his ATTORNEYS

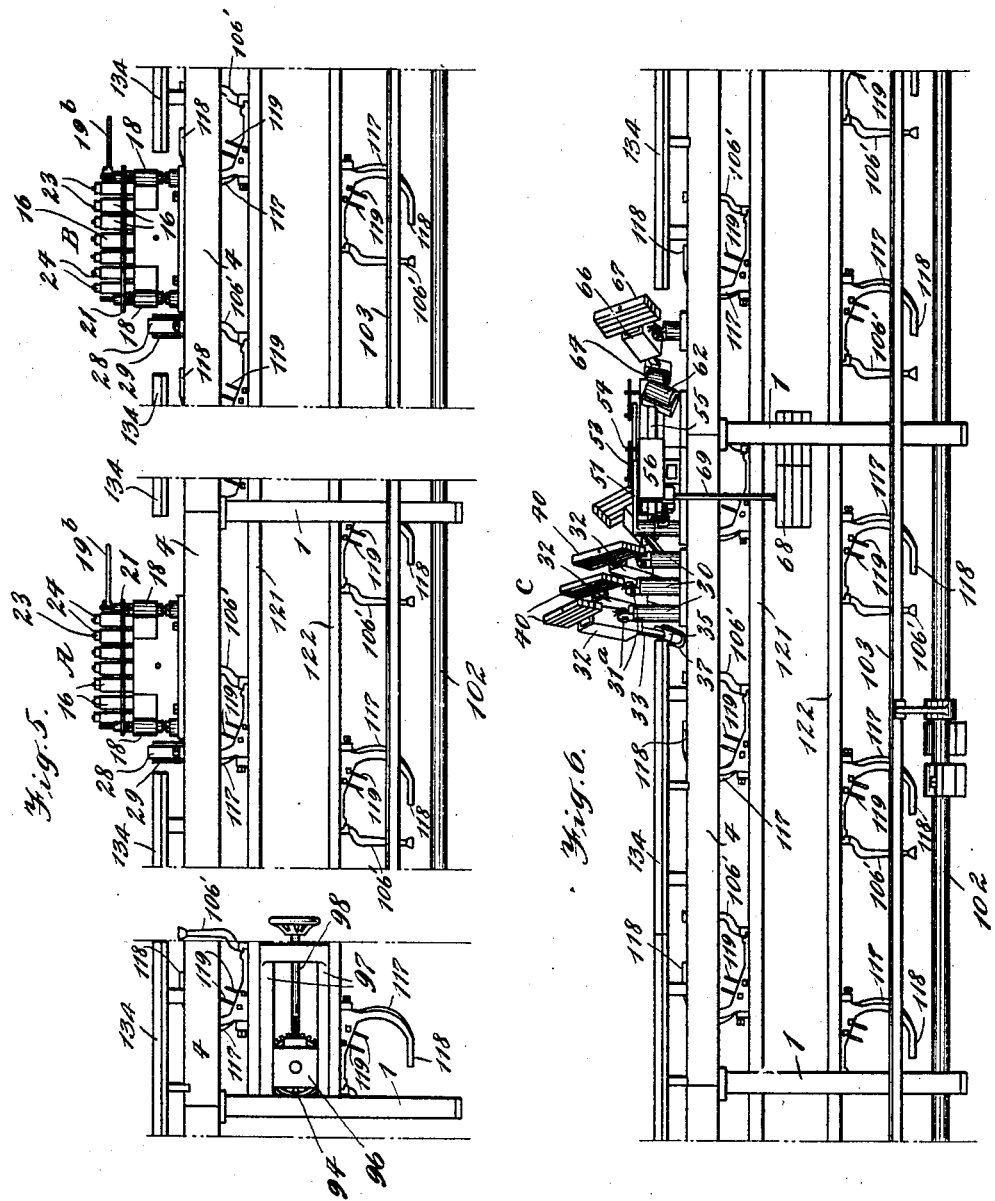

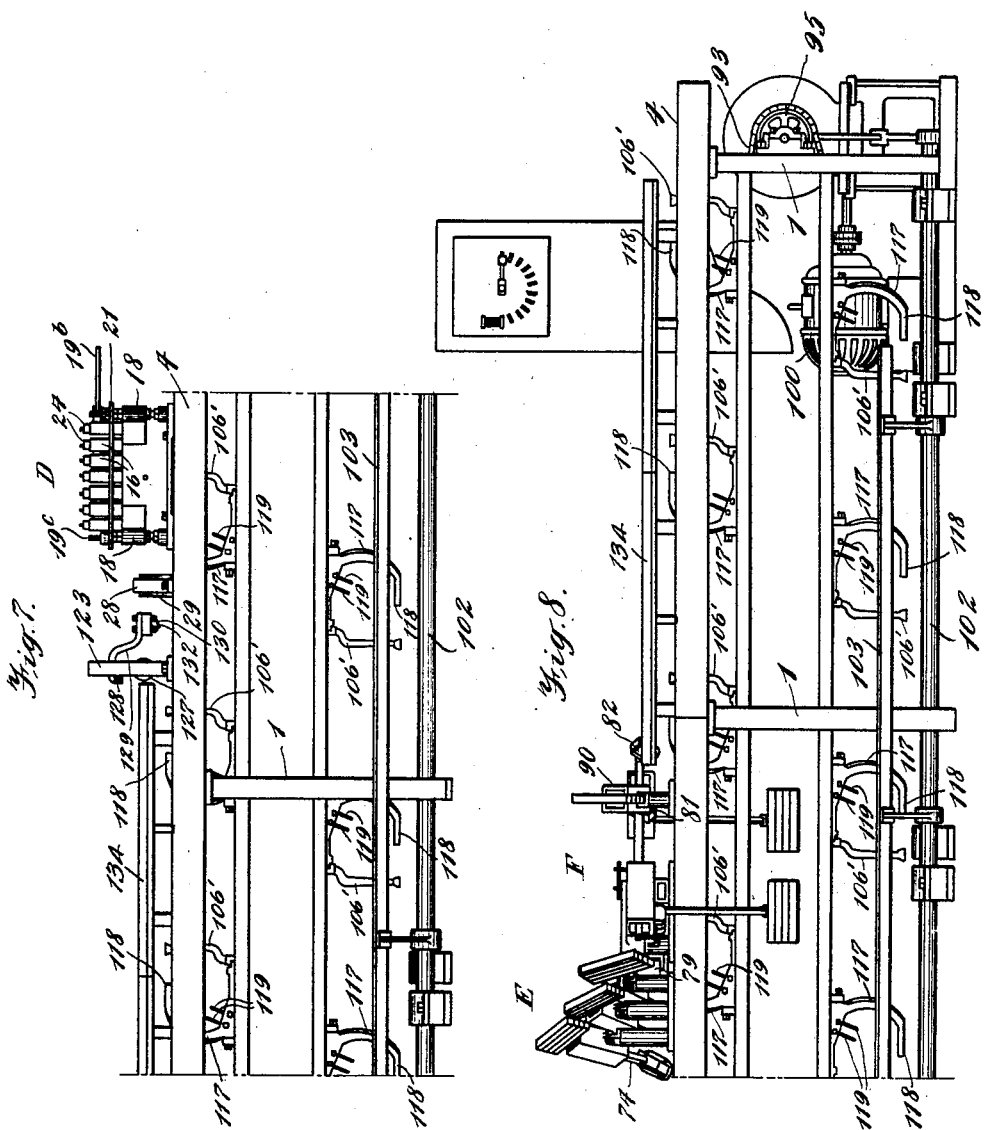

M. H. CLARK.
MACHINE FOR MAKING RUBBER GOODS.
APPLICATION FILED JAN. 10, 1913.

1,218,983.

Patented Mar. 13, 1917.
15 SHEETS—SHEET 5.

WITNESSES:
Arthur Groat
M. E. McNinch

INVENTOR.
Myron H. Clark
BY
Gifford Bull
his ATTORNEYS

M. H. CLARK.
MACHINE FOR MAKING RUBBER GOODS.
APPLICATION FILED JAN. 10, 1913.
1,218,983.
Patented Mar. 13, 1917.
15 SHEETS—SHEET 6.
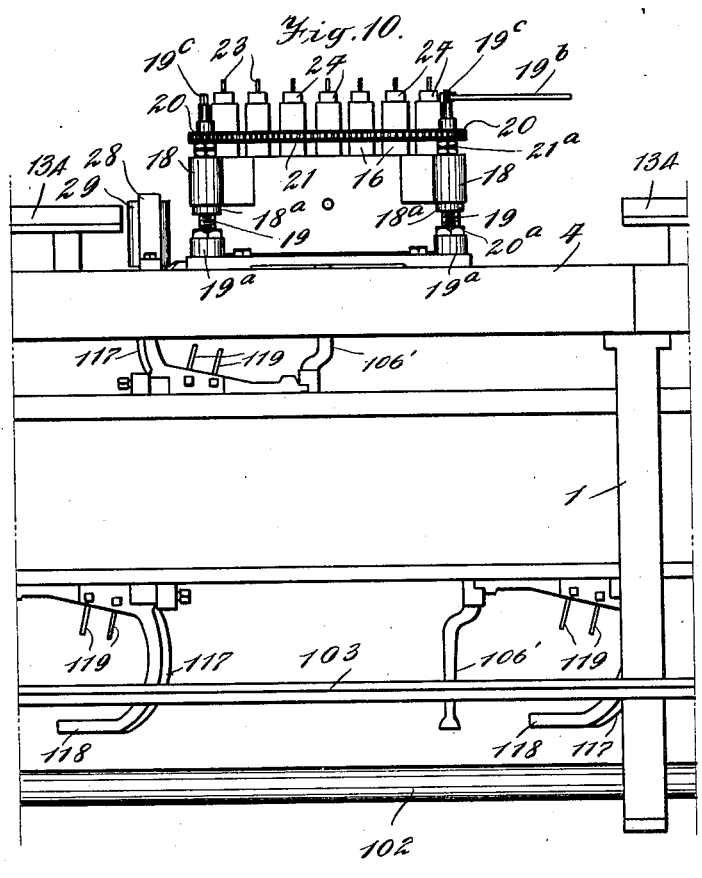
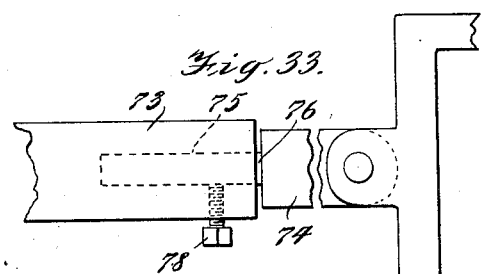
WITNESSES:
INVENTOR.

M. H. CLARK.
MACHINE FOR MAKING RUBBER GOODS.
APPLICATION FILED JAN. 10, 1913.
1,218,983.
Patented Mar. 13, 1917.
15 SHEETS—SHEET 7.
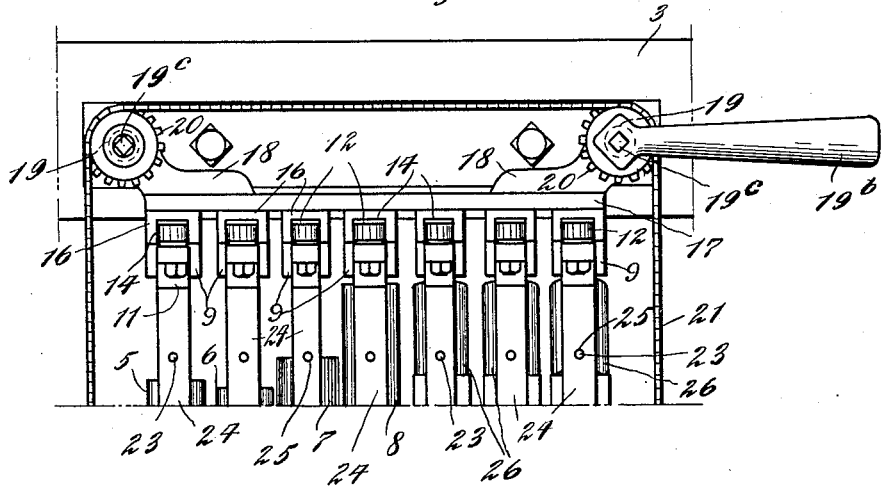
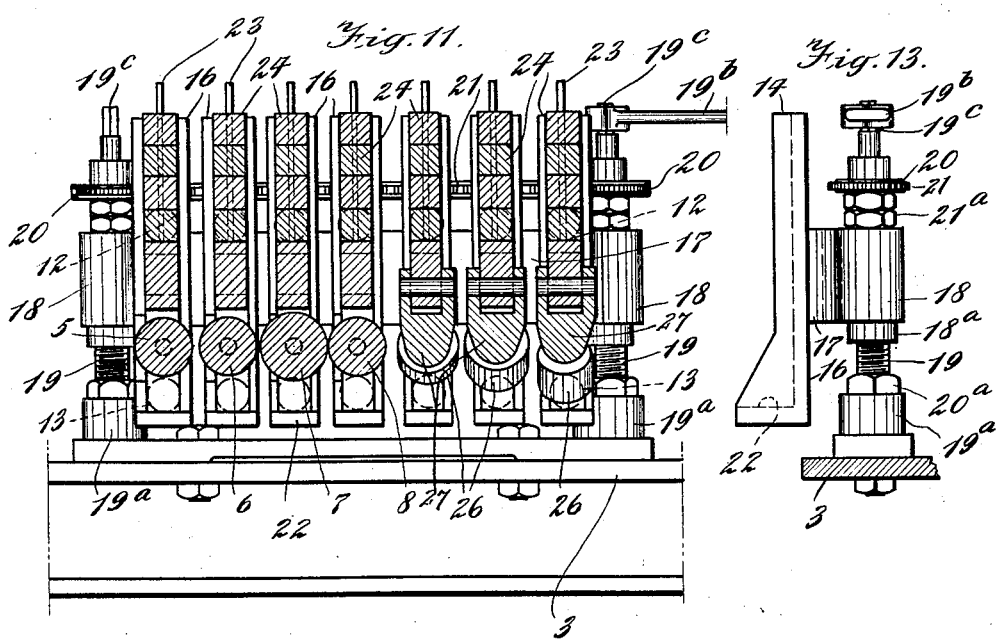
WITNESSES:
Arthur Goat
M. E. McNinch
INVENTOR.
Myron H. Clark
BY Gifford Bull
his ATTORNEYS

M. H. CLARK.
MACHINE FOR MAKING RUBBER GOODS.
APPLICATION FILED JAN. 10, 1913.

1,218,983.

Patented Mar. 13, 1917.
15 SHEETS—SHEET 8.

WITNESSES:
Arthur Goat
M. E. McNrich

INVENTOR.
Myron H. Clark
BY Gifford Bull
his ATTORNEYS

M. H. CLARK.
MACHINE FOR MAKING RUBBER GOODS.
APPLICATION FILED JAN. 10, 1913.

1,218,983.

Patented Mar. 13, 1917.
15 SHEETS—SHEET 9.

WITNESSES:
Arthur Goat
M. E. McNinch

INVENTOR.
Myron H. Clark
BY Gifford Bull
his ATTORNEYS

M. H. CLARK.
MACHINE FOR MAKING RUBBER GOODS.
APPLICATION FILED JAN. 10, 1913.

1,218,983.

Patented Mar. 13, 1917.
15 SHEETS—SHEET 10.

WITNESSES:
Arthur Goat
M. E. McNinch

INVENTOR.
Myron H. Clark
BY Gifford & Bull
his ATTORNEYS

M. H. CLARK.
MACHINE FOR MAKING RUBBER GOODS.
APPLICATION FILED JAN. 10, 1913.

1,218,983.

Patented Mar. 13, 1917.
15 SHEETS—SHEET 12.

WITNESSES:
Arthur Goat
M. E. McKinch

INVENTOR.
Myron H. Clark
BY
Gifford Bull
his ATTORNEYS

M. H. CLARK.
MACHINE FOR MAKING RUBBER GOODS.
APPLICATION FILED JAN. 10, 1913.
1,218,983. Patented Mar. 13, 1917.
15 SHEETS—SHEET 13.
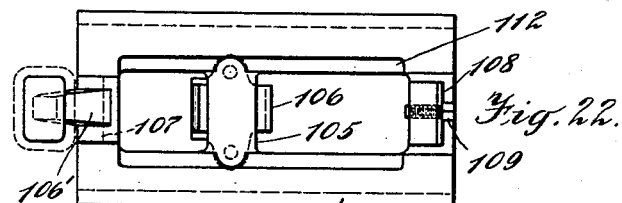
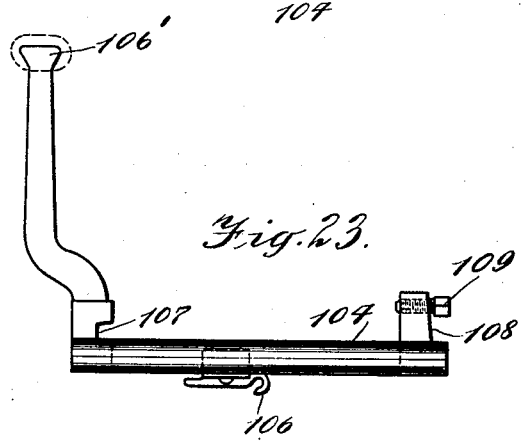
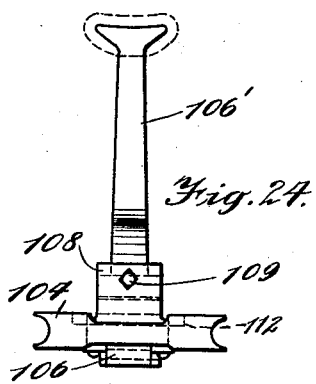
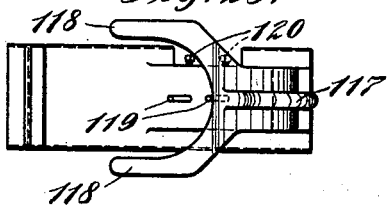
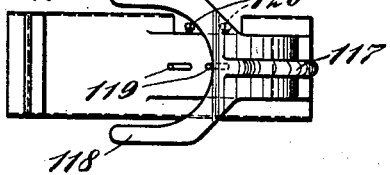
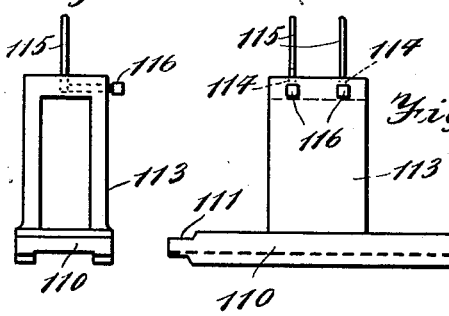
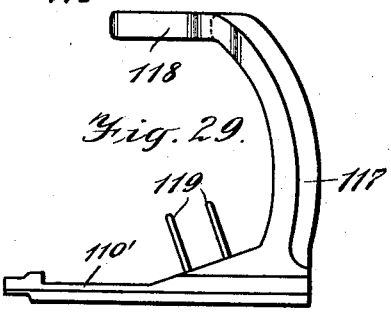
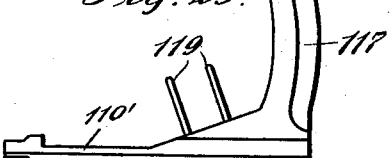
WITNESSES:
Arthur Goat
M. E. McNinch
INVENTOR.
Myron H. Clark
BY Gifford & Bull
his ATTORNEYS

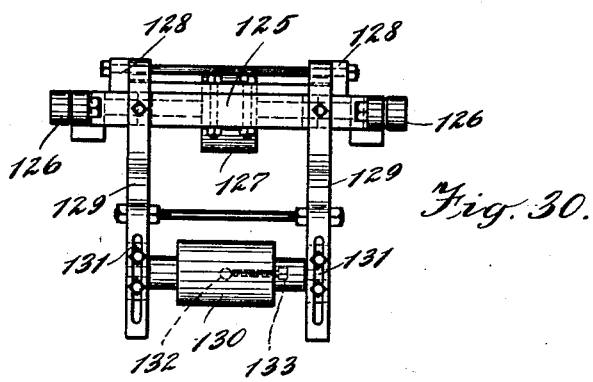
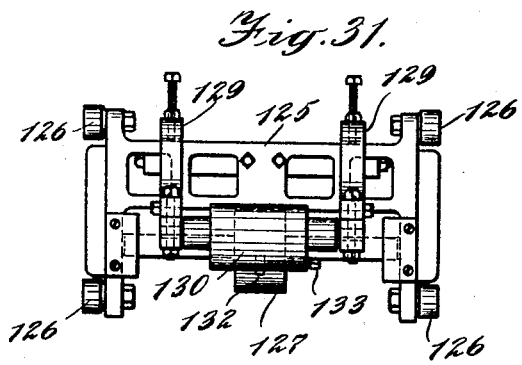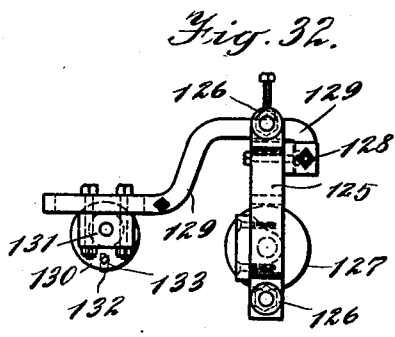

M. H. CLARK.
MACHINE FOR MAKING RUBBER GOODS.
APPLICATION FILED JAN. 10, 1913.
1,218,983.
Patented Mar. 13, 1917.
15 SHEETS—SHEET 15.
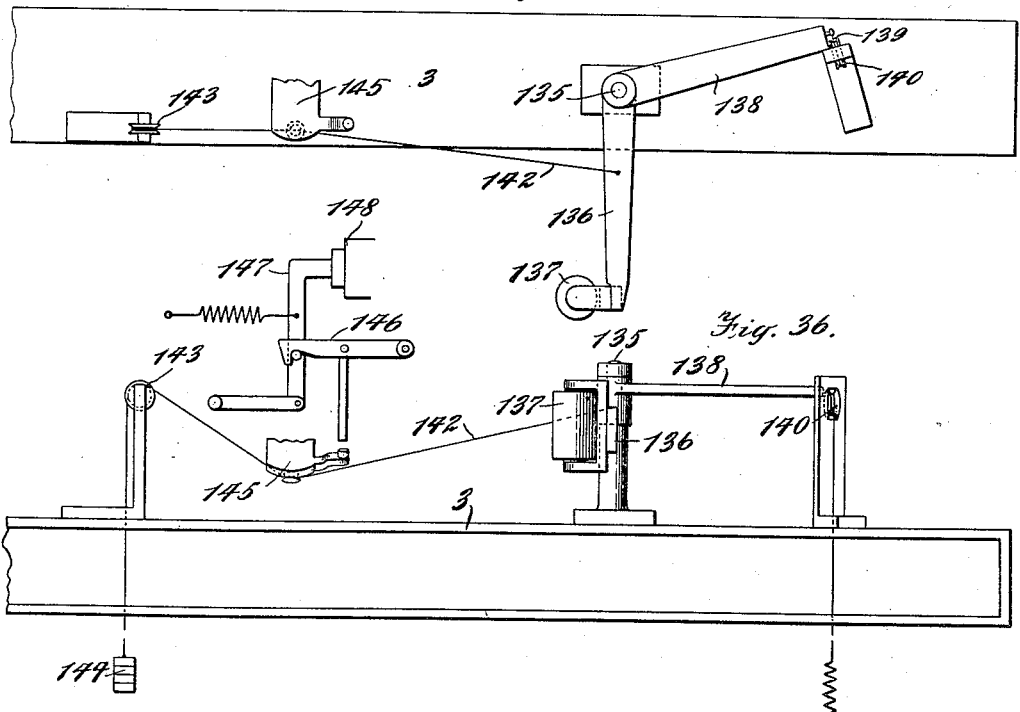
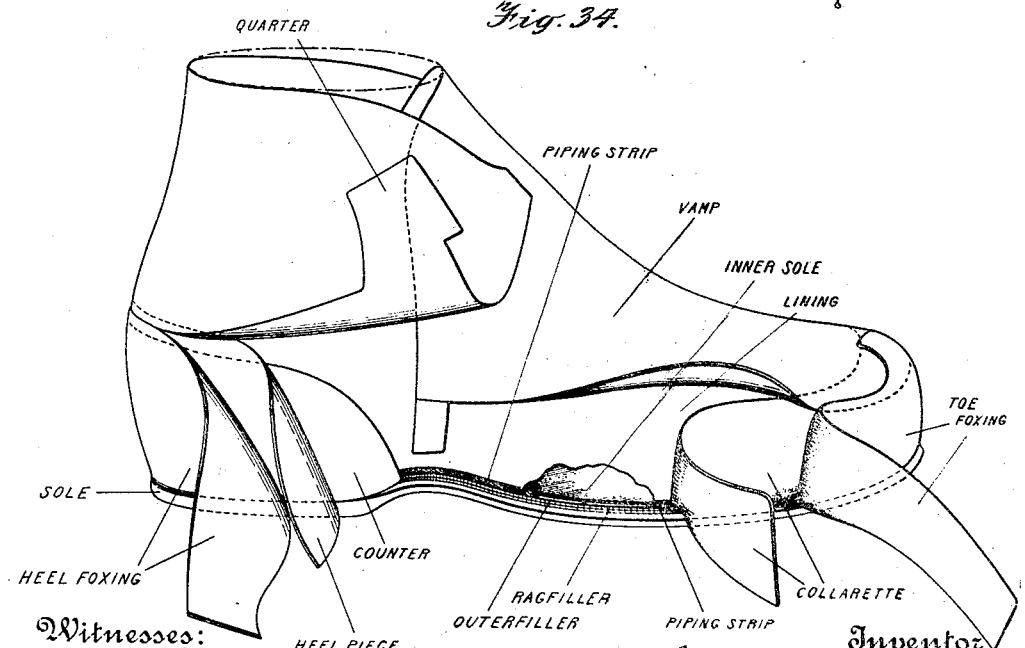

though I describe it hereinafter as appli-
UNITED STATES PATENT OFFICE.

MYRON H. CLARK, OF MALDEN, MASSACHUSETTS, ASSIGNOR TO THE GOODYEAR'S METALLIC RUBBER SHOE COMPANY, A CORPORATION OF CONNECTICUT.

MACHINE FOR MAKING RUBBER GOODS.

1,218,983.   Specification of Letters Patent.   Patented Mar. 13, 1917.

Application filed January 10, 1913.   Serial No. 741,213.

*To all whom it may concern:*

Be it known that I, MYRON H. CLARK, a citizen of the United States, residing at Malden, in the county of Middlesex and State of Massachusetts, have invented certain new and useful Improvements in Machines for Making Rubber Goods, of which the following is a specification.

My invention relates to new and useful improvements in machines for making rubber goods, and more particularly rubber footwear and rubber soled footwear, and is applicable to all forms of rubber soled footwear, irrespective of the construction of the upper, that is it is applicable for the manufacture of over-shoes of all kinds in which the upper consists of rubber or a rubber-coated fabric, or to arctics, gaiters, or tennis shoes, in which the upper consists of uncoated fabric, and to rubber boots and similar footwear. The objects of the invention are primarily to provide a machine which will mechanically perform operations in the manufacture of rubber footwear hitherto exclusively performed by hand. A further object is to provide a machine wherein the quality of the footwear produced will be higher than that hitherto produced by hand, and in which the high quality will be uniform.

Further objects will appear during the detailed description to follow hereinafter.

The invention consists in the construction and the arrangement of parts in operative combination to be fully described hereinafter, and the novelty of which will be particularly pointed out and distinctly claimed.

Before proceeding with a detailed description of my invention, I desire to state that although I describe it hereinafter as applicable for the construction of rubber soled shoes known as arctics, I do not desire to be limited in any way to the particular details of the machine making it applicable for use on arctics, as the construction and combinations shown and described are applicable not only for the manufacture of arctics, but may be used either in part or in whole for the manufacture of all types of rubber soled shoes, and other articles consisting of layers of fabric and rubber which are successively built up, and which must be subjected to pressure in order to properly unite the same.

I have fully and clearly illustrated my invention in the accompanying drawings to be taken as a part of this specification, and wherein—

Figure 1 is a plan view of one end of the machine showing parts broken away between mechanisms which operate on the shoe.

Fig. 2 is a plan view of that part of the machine forming a continuation of the right-hand portion of the part shown in Fig. 1.

Fig. 3 is a plan view of that part of the machine forming a continuation of the right-hand part of Fig. 2.

Fig. 4 is a plan view of one extreme end of the machine forming a continuation of the right-hand part of Fig. 3.

Fig. 5 is a broken view in side elevation of the part of the machine shown in Fig. 1.

Fig. 6 is a view in side elevation corresponding to the view shown in Fig. 2 and constituting a continuation of the right-hand portion of the view shown in Fig. 5.

Fig. 7 is a view in side elevation of that part of the machine shown in Fig. 3 and constituting a continuation of the right hand portion of the view shown in Fig. 6.

Fig. 8 is a view in side elevation of the part of the machine shown in Fig. 4 and constituting a continuation of the right-hand side of the part shown in Fig. 7.

Fig. 10 is an enlarged side elevation of the part of the machine shown in Fig. 9 and the central portion of Fig. 5.

Fig. 11 is a vertical central longitudinal section through the rolls shown in Figs. 9 and 10.

Fig. 12 is an enlarged plan view of one end of the roll mechanism shown in Figs. 9, 10 and 11.

Fig. 13 is a detail view in front elevation of the roll-supporting guide and the means for adjusting the same.

Figure 9:
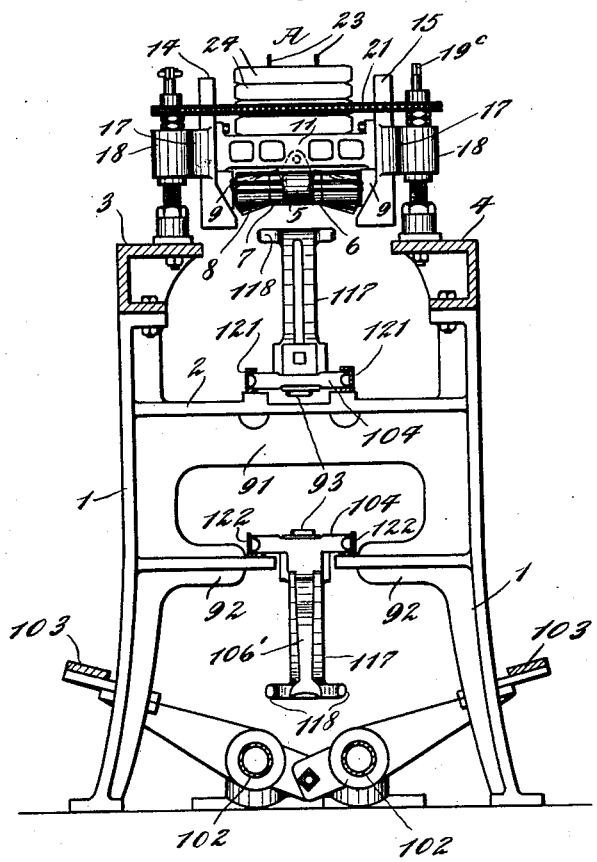
Fig. 9 is a section on the line 9—9 of Fig. 1.
Figure 14:
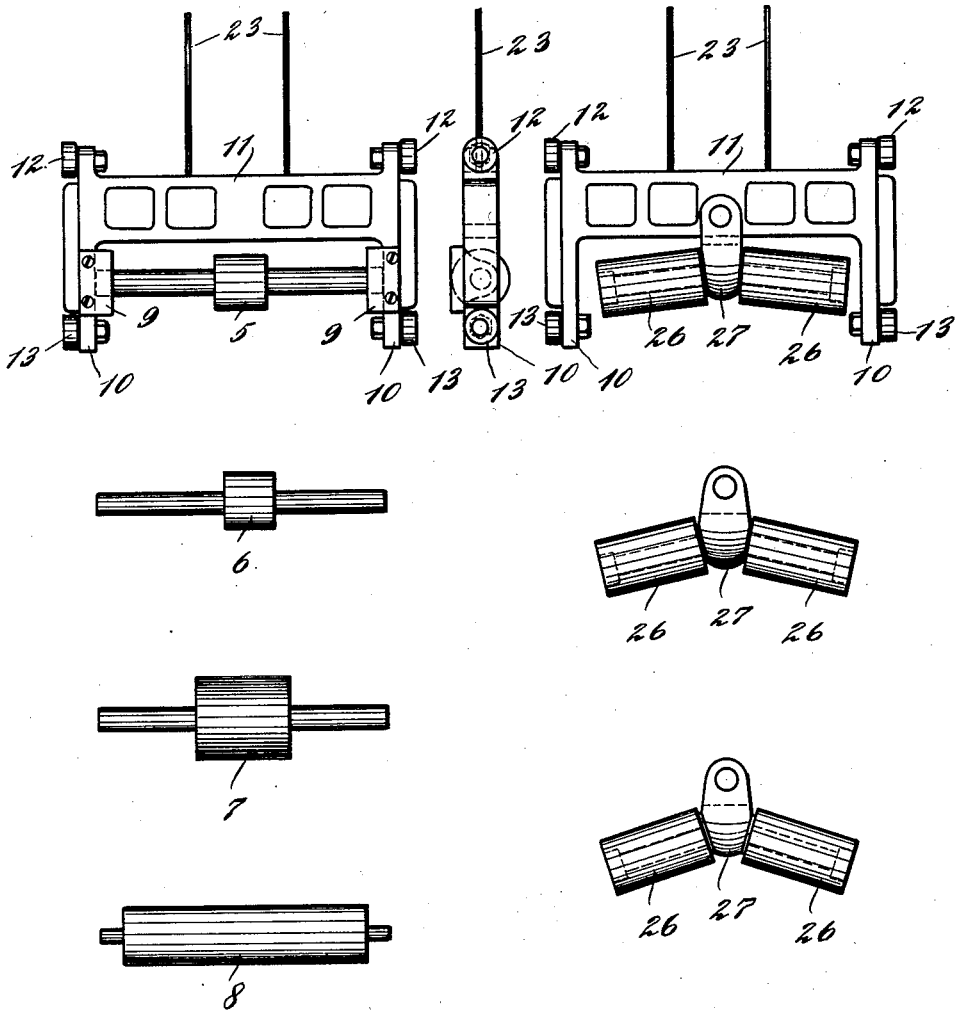

Fig. 14 includes views in elevation showing the sequence of rolls from beginning to end in the mechanism illustrated in Figs. 9, 10, 11 and 12.

Figure 15:
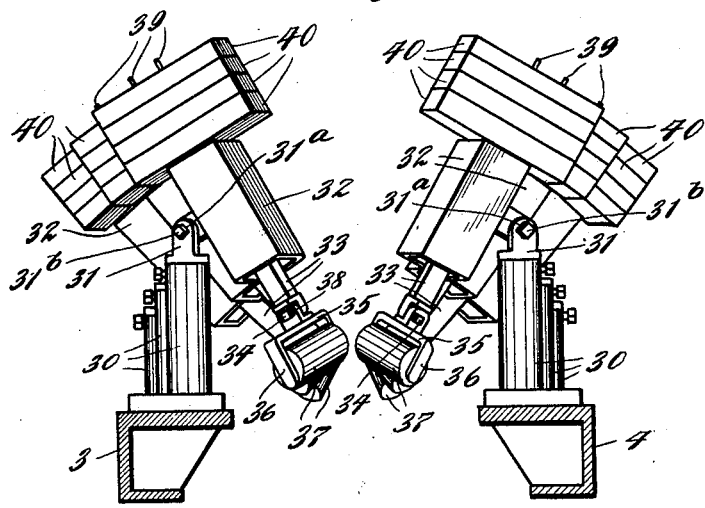

Fig. 15 is a vertical transverse section on the line 15, 15 of Fig. 2, certain parts being omitted for the sake of clearness.

Figure 16:
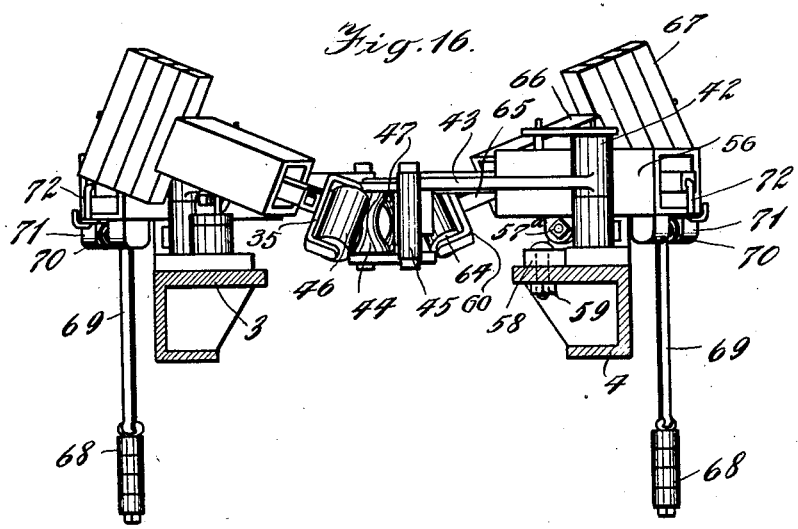

Fig. 16 is a vertical transverse section on the line 16, 16 of Fig. 2, certain parts being omitted for the sake of clearness.

Figure 17:
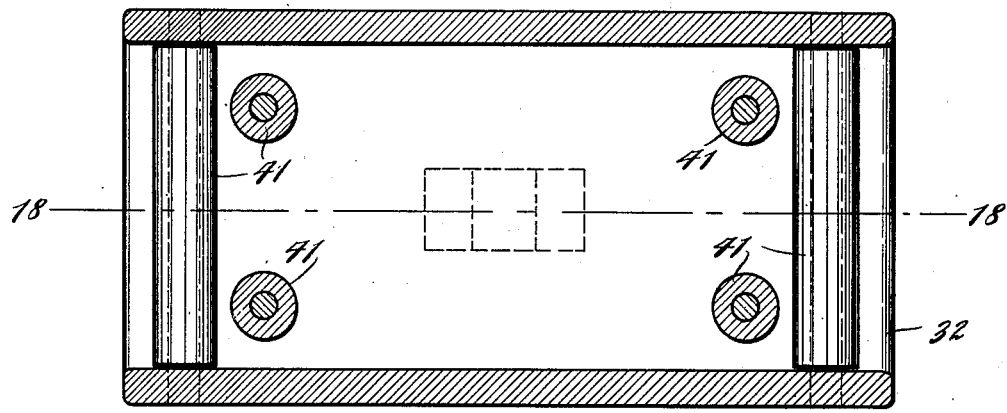

Fig. 17 is a longitudinal central sectional view through one of the guides for the rolls illustrated in Figs. 2, 4, 6, 8, 15 and 16.

Figure 18:
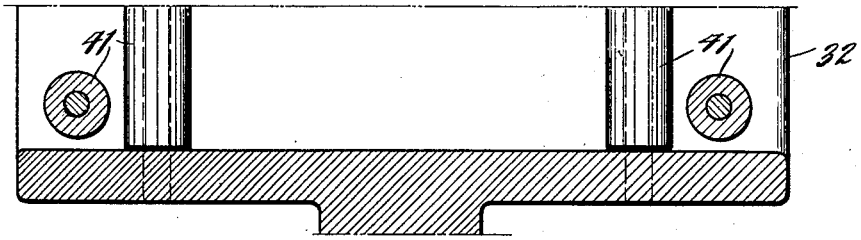

Fig. 18 is a section on the line 18—18 of Fig. 17.

Figure 19:
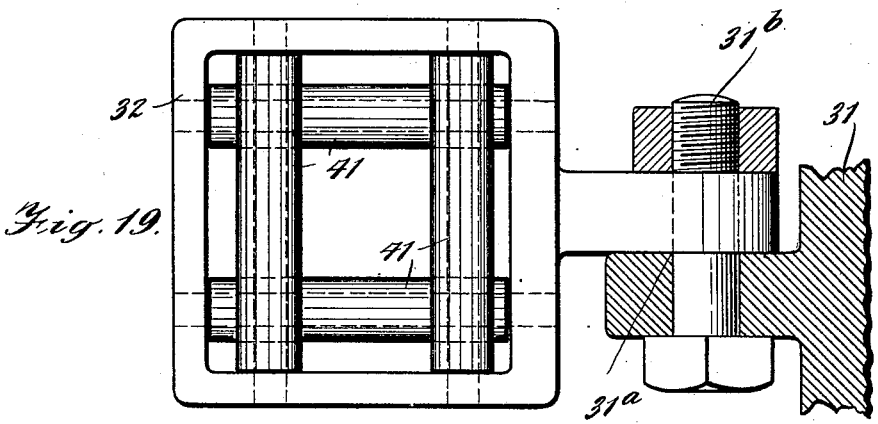

Fig. 19 is a view in end elevation of the guide shown in Figs. 17 and 18, and showing the means for adjustably mounting the same.

Figure 20:
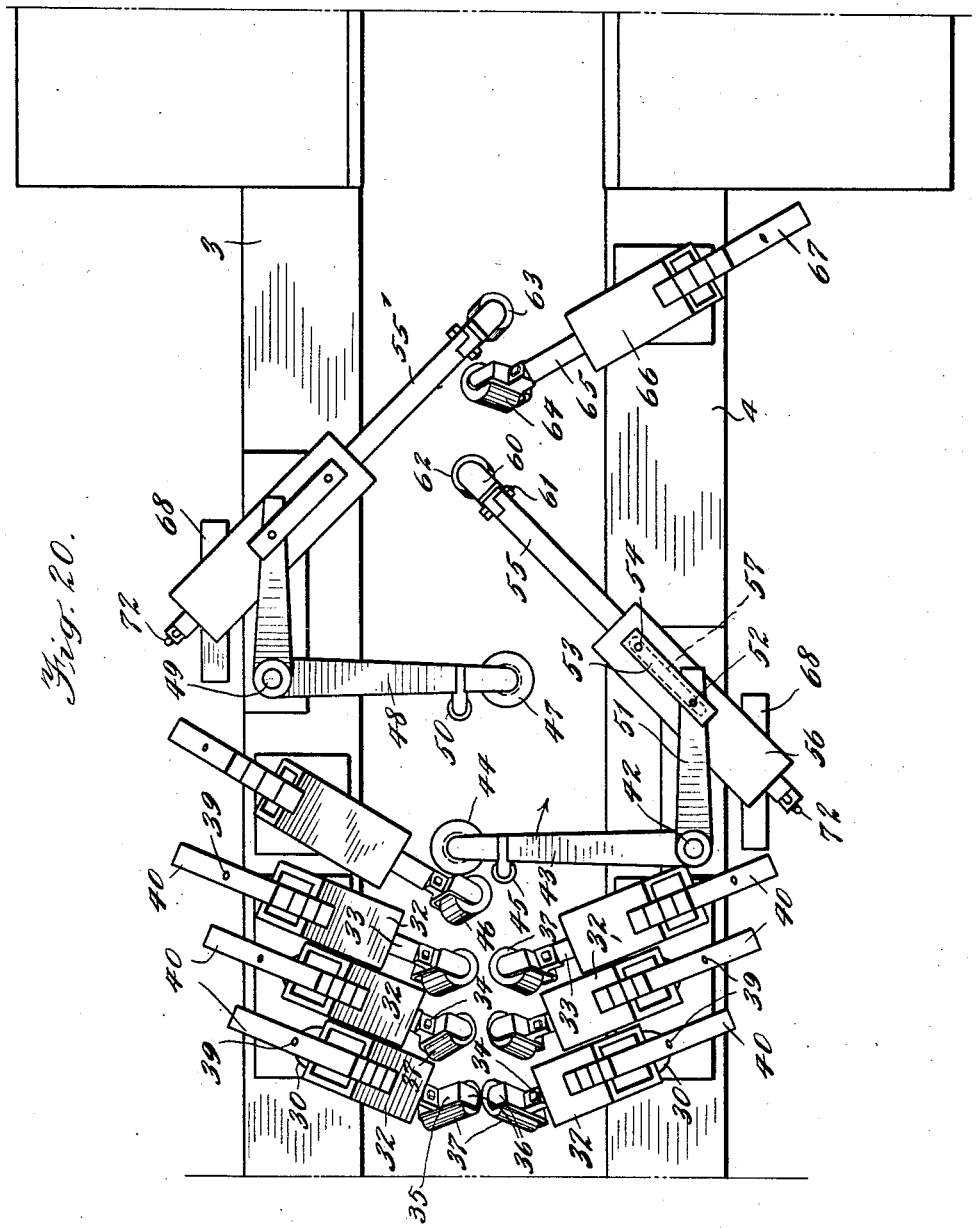

Fig. 20 is an enlarged plan view of the roller mechanism shown in Figs. 2, 6, 15 and 16.

Figure 21:
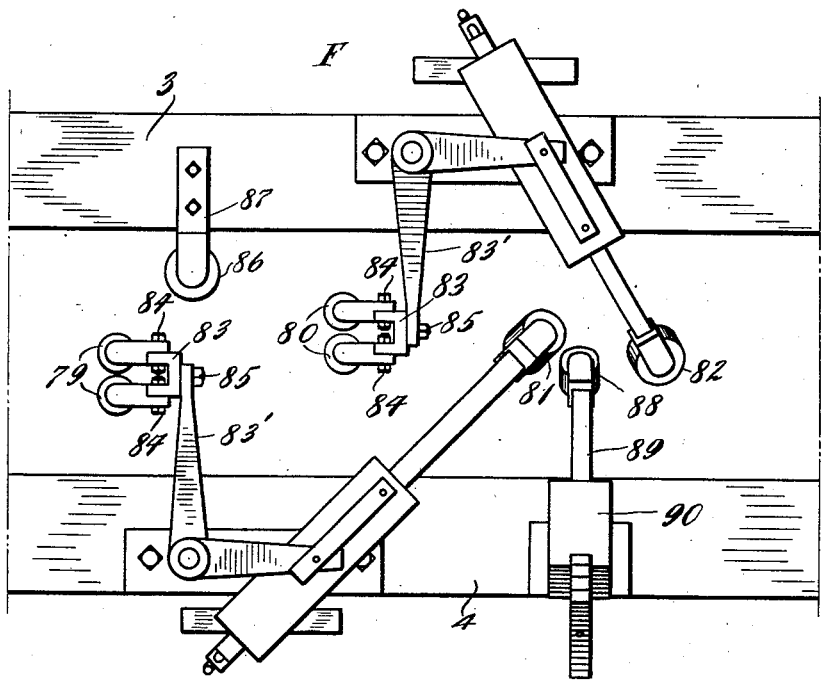

Fig. 21 is an enlarged plan view of a portion of the roller mechanism shown in Figs. 4 and 8.

Fig. 22 is a plan view of one of the last-supporting cars.

Fig. 23 is a view in side elevation of the construction shown in Fig. 22.

Fig. 24 is a view in end elevation looking from the right of Figs. 22 and 23.

Fig. 25 is a view in plan of a chair for supporting a last upon which is to be formed an arctic.

Fig. 26 is a view in side elevation of the construction shown in Fig. 25.

Fig. 27 is a view in end elevation of the construction shown in Figs. 25 and 26.

Fig. 28 is a plan view of a chair for supporting a last for gaiters.

Fig. 29 is a view in side elevation of the construction shown in Fig. 28.

Fig. 30 is a plan view of a marking device for marking sizes on the shoes made by the machine.

Fig. 31 is a view in front elevation of the construction shown in Fig. 30.

Fig. 32 is a view in side elevation of the construction shown in Figs. 30 and 31.

Fig. 33 is a detailed sectional view of the connection between two parts of one of the plunger bars.

Fig. 34 is a view of a last supporting an arctic, parts of the shoe being cut away and laid back to expose underlying parts, so as to make the construction of the shoe clearly understood.

Fig. 35 is a plan view of a stop mechanism for controlling the motive power for driving the conveyer; and Fig. 36 is a view in side elevation of said stop mechanism.

I will now proceed to describe the preferred embodiment of my invention herein shown in detail, for the purpose of clearness, setting forth the progress of manufacture of a form of rubber soled shoe, and describing the construction and operation of the various parts and mechanisms in the order in which they successively perform the steps of manufacture.

In the embodiment of the invention hereinafter described, and which appears to me at the present time to be the best manner of carrying the same into effect, I have shown a plurality of mechanisms, each for performing separate and distinct operations in the manufacture of rubber soled shoes, said mechanisms being designated generally at A, B, C, D, E and F for performing the several functions in manufacturing arctics, although it will be understood that these mechanisms and their functions, as hereinafter set forth in detail, may be altered in their sequence as the construction of the article upon which they operate may dictate. Means is provided for successively presenting the lasts or forms to said mechanisms, which means may, as hereinafter described, be an endless conveyer.

In the preferred embodiment of the invention herein disclosed, the machine includes a suitable framework which may consist of a plurality of standards, each composed of vertical legs 1 connected by a transverse member 2, (see Fig. 9) the upper ends of said legs supporting right and left side rails 3, 4, running parallel to each other lengthwise of the machine, and spaced apart to provide a free passage or space lengthwise of the machine.

Running lengthwise of the machine beneath the said passage, is an endless conveyer, to be hereinafter described, adapted to carry upon the upper run thereof, the lasts or forms upon which the shoes or other articles are to be formed, to present said lasts or forms to the several mechanisms, the upper run of the conveyer traveling below the level of the side rails of the machine frame. The lasts, if lasts are the forms used, are so supported that the toes thereof point in the direction of travel of the upper run of the conveyer.

I do not deem it necessary to go into a detailed description of the shoe construction, but have indicated on Fig. 34 of the drawings herein the names of the various parts so that the construction will be understood.

In constructing the shoes a last of the desired size has applied thereto the lining and the inner sole of the shoe, and a toe-strip is applied overlapping the lining and said inner sole, and a rag sole is applied lengthwise of the bottom of the last so as to overlap the inturned edge of the toe-strip. The last is then placed on the conveyer by the operator and is presented to the mechanism designated generally at A. This mechanism includes a set of rollers designed to roll the rag sole, the inner sole and the inturned edge of the toe-strip firmly together, and the rollers are preferably constructed and arranged so as to exert the pressure first centrally and longitudinally of the sole, and then laterally toward the edges thereof. The rollers in their arrangement may take a number of forms, but I prefer the form which I have illustrated in the drawings which has proved satisfactory in practice. This arrangement, referring particularly to Fig. 14, comprises a primary roller 5, arranged to revolve on a horizontal axis so as to contact with the longitudinal central portion of the sole when the latter passes thereunder. Arranged behind the roller 5 is a second roller 6 of substantially the same form as said first roller, but which is arranged to revolve in a path to one side of the roller 5 so that right and left lasts will be rolled substantially down the center portion of the sole.

Arranged in rear of the roller 6 is a third roller 7, of a length greater than the length of the rollers 5, 6, above described, that is preferably greater than the distance from the extreme left end of the roller 5 to the extreme right end of the roller 6, said roller 7, because of its greater length, being adapted to roll a greater area down the center of the sole than the two first-mentioned rollers together, so as to effectively unite the rag sole and the inner sole. This third roller 7 is preferably of considerably greater diameter than either of the rollers 5, 6, so as to insure proper contact with the forward lower end of the toe, which is at a level below the ball of the sole and below the lower level of rollers 5, 6. This third roller 7 has its axis of rotation above the advancing toe portion of the last a sufficient distance that the last may freely pass thereunder without danger of striking the shaft of said roller. This roller 7 is also arranged to have its lower surface below the lower level of the first two rollers 5, 6, so as to insure proper contact with the forward lower end of the toe, which is at a level below the ball of the sole.

In rear of the roller 7 is a fourth roller 8 arranged to rotate on an axis parallel with the rollers 5, 6, 7, but of such width as to roll substantially the entire lower surface of the sole. This roller is of the same diameter as the rollers 5, 6, described, and, it will be noted from Fig. 11, all of these horizontally-disposed rollers are arranged to have their axes of rotation on substantially the same level when a last is not passing through the machine.

The rollers 5, 6, 7 and 8, just described, serve to roll down and unite the central portion of the sole lining, inner sole and rag sole for practically the whole width of the shank, and substantially all of the heel, and, in order that they may freely contact with the sole, shank and heel and move toward and away from the same as the latter pass beneath the same, I mount or journal them in supports whereby they positively engage the materials on the last, but may adjust themselves to conform to the contour of the sole, shank and heel as the last passes beneath them. I accomplish this by arranging the said rollers so that they gravitate into contact with the sole, and for this purpose mount each of the roller shafts in bearings 9 mounted in end pieces 10 of a frame 11, said end pieces of the frame carrying upper and lower guide rollers 12, 13, adapted to travel in vertical grooves 14, 15 (see Fig. 1) in vertically alining channel guide members 16 mounted on the frame at the opposite ends of the rollers. The guide members 16 are mounted on horizontal supporting bars 17, each carrying brackets 18 supported on collars 18ª fixed on vertical, rotatable columns 19 threaded into seats 19ª, said columns carrying at their upper ends sprocket wheels 20 fixed thereto, all of which sprocket wheels are engaged by an endless sprocket chain 21 whereby said columns may be simultaneously rotated to lift the bars 17 and thereby lift the frames 11 and adjust the height of the rollers above the path of travel of the last. The columns may each be provided with check nuts 20ª, 21ª to fix the position of the frames and hold the columns against rotation. The downward movement of the roller-carrying frames is limited by shoulders 22 at the lower ends of the respective guide pieces 16. Means is provided for weighting each of the frames 11 so that the desired contact between the roller carried thereby and the shoe may be obtained. I accomplish this by providing on the upper portion of each frame supporting bars 23 adapted to support one or more weights 24 having apertures 25 to receive said bars.

In rear of the rollers 5, 6, 7, 8, above described, and mounted in frames traveling in guides, similar to those above described, are a plurality of rollers 26 for exerting pressure on the side edge portions of the sole, shank and heel not united by the rollers first described, due to the transverse curvature of the sole. These rollers 26 for rolling the side portions of the sole are supported in pairs from the frames 16 by a central bracket 27, the rollers of each pair extending in opposite directions from the bracket and having their axes of rotation inclined from their point of support downwardly in opposite directions and in the same vertical plane so that the contact surfaces of the rollers conform substantially to the transverse curvature of the sole when the shoe passes thereunder. I provide preferably three sets of such inclined pairs or sets of rollers, the same being arranged to rotate on axes of successively increasing pitch so that the action of the pairs of rollers is successively to roll the sole from the central portion thereof toward its outer edge. The arrangement of these rollers just described is clearly illustrated in Fig. 11 and the right-hand portion of Fig. 14.

The frames of these rollers are constructed and guided in the same manner as those carrying the rollers 5, 6, 7, 8, and the guides therefor are mounted on the frame members so that they may be simultaneously adjusted along with the rollers, 5, 6, 7, 8.

I preferably form all of these rollers just described of a resilient or yielding substance such as rubber, so that, when pressed against the sole, they will conform to the curvature of the last and press the sole strongly into engagement with the last so that all the parts of the sole will be properly united.

Any suitable means may be employed for rotating one of the columns 19 so as to adjust the roller-carrying frames, as, for instance, by providing each of the posts at its upper end with a wrench-head 19$^c$ adapted to be engaged by a socket wrench 19$^b$, as shown at the right of Figs. 11 and 12.

After the last carrying the shoe has passed the rollers of the mechanism A, described, the last is removed from the carrier by an operator and the counter, heel-piece, vamp, quarter, and outer filler or sole-piece are applied, the counter, filler and heel-piece being previously cemented so that they will adhere in place; the vamp and quarter have sticky rubber on their inner faces so that they adhere to the lining when applied thereto. The last is again mounted on the endless conveyer and is presented to a second set of rollers B, which may be of substantially the same construction as the first set of rollers embraced in the mechanism A heretofore described, and which serve to roll the outer filler down upon the rag filler. This operation also serves to form a tight joint between the inturned lower edge of the heel-piece, the rag sole and the outer filler. I do not deem it necessary to enter into a detailed description of this set of rollers as it may be, and preferably is, substantially the same as the set A heretofore described. In advance of both of these sets of rollers A, B, and supported by the frame-work of the machine are inwardly-projecting brackets 28 carrying at their inner ends guide rolls 29, rotating on vertical axes, which operate to engage the sides of the last to center the latter as it is presented to the rolls.

The last, after having passed the set of rollers B, is removed from the carrier and the toe and heel foxing is applied so that the lower edges thereof closely approach and preferably engage the edges of the rag sole and the outer filler. In the form of the arctic described the toe foxing at its upper edge lies over the lower edge of the vamp, and the upper edge of the heel foxing abuts the lower edge of the quarter. These foxings are of soft sticky rubber and adhere to the toe and heel-pieces and to the vamp and quarter, and the last is then replaced on the conveyer and passes to a mechanism C to roll the foxings into position so as to adhere to the parts they overlie. This mechanism comprises a plurality of rollers normally urged toward the last into yielding contact with the shoe thereon, and preferably arranged to rotate on their axes so as to progressively roll from the sole edge of the foxing toward the upper edge thereof.

The arrangement and construction of this third mechanism C, to which the shoes are subjected, is shown in plan in Figs. 2 and 20, and in section in Figs. 15 and 16.

I will now proceed with the detailed description of the same: Mounted on the side frames, 3, 4, of the machine and arranged longitudinally thereof are a plurality of hollow pedestals 30, in this instance three on each side of the machine, in which are arranged plungers 31, to the upper end of each of which is pivoted as at 31$^a$, a guide member or bearing box 32, through which is adapted to reciprocate a plunger bar 33, the lower ends of which plunger bars are normally located closely adjacent the path of travel of the shoe being formed. The plungers 31 are rotatable in the pedestals 30, and are also movable longitudinally thereof, so that the height of the bearing boxes and the direction of the bars 33 may be regulated relative to the shoe as it passes through the machine. On the lower end of each of these plunger rods 33 is pivoted, as at 34, a yoke 35 in the arms 36 of which are journaled the gudgeons or pivot pins of rollers 37, the pivotal arrangement being provided so that the yokes may be adjusted or swung relative to the plungers 33 and clamped thereto by the bolts 38, so as to regulate the angle of the contact surface of the rollers relative to the surface they are to contact with, that is the foxings. The pivots 31$^a$, preferably consist of clamping bolts 31$^b$, passing through ears on the posts 31, and the bearing boxes respectively, so that the boxes may be swung to the desired inclination and then clamped rigidly in position to have the rollers 37 in proper relation to the last. The plungers 33 are arranged to reciprocate freely lengthwise of the bearing boxes 32, and at their upper ends carry pins 39 to receive one or more weights 40, to provide for the degree of contact exerted by the rollers upon the last when the latter is subjected to the rollers. It is desirable that the plunger rods 33 have a free and unrestricted movement through the bearing boxes 32, and I therefore provide anti-friction rollers 41 extending transversely of the interior of the boxes and adapted to contact with the plunger rods preferably as shown in Figs. 17, 18 and 19. As shown in the drawings I prefer to employ the rollers 37 in pairs, the rollers of each pair being mounted on opposite sides of the machine so that the last is simultaneously engaged on opposite sides by the rollers of each pair. As shown in Fig. 15 the rollers 37 are arranged with the axes thereof inclined downwardly from the center of the path of travel of the last, the inclination of the axes of the successive pairs being increased so that the foxings are rolled successively from the sole edge of the last toward the upper edge portion of the foxing. These rollers just described roll the portions of the foxing on the sides of the last, and I will now proceed to describe the means for rolling the foxings about the extreme curved toe portions and curved heel portions of the last. Referring particularly to Figs. 16 and 20, mounted on a pivot 42, preferably on the right-hand side member of the frame, is a swinging arm 43, the free end of which projects across the path of movement of the last and carries at its free end a vertically disposed roller 44, in such position that as the last passes through the machine said roller will engage the foxing on the opposite side of the toe portion from that side upon which the arm 43 is pivoted, so that as the last advances said arm will swing in the direction of the arrows as shown in Fig. 20 and will wipe around the end of the toe from left to right, to roll the foxing into position. In order to insure the correct swinging movement of arm 43 and roller 44 I provide a small contact roller 45 arranged to be contacted with by the toe of the shoe so that the arm will be swung freely by engagement of the shoe with said contact roller and the shoe will be prevented from striking the arm 43 should the toe of the last be deflected toward the right during its progress. In order to prevent the contact of the roller 44 with the shoe from deflecting the shoe to one side so as to endanger the supporting means for the last, I provide a counter-balancing roller 46 in advance of the swinging roller 44, so that any pressure by the swinging roller tending to deflect or cant the last will be opposed by said counter-balancing roller. This counter-balancing roller is preferably mounted and supported in the same manner as the foxing rollers 37, heretofore described.

The roller 44 carried by the swinging arm is preferably spool-shaped or curved, as shown in Fig. 16, so that the contacting surface thereof will conform as nearly as possible to the curve or contour of the toe of the shoe, so that the foxing over the curved portion will be smoothly rolled into place without danger of spaces or blisters being formed between the same and the underlying parts.

At a suitable distance in rear of the roller 44 I provide another roller 47, mounted in an arm 48, pivoted to the left-hand frame member as at 49, said roller being normally located to the right beyond the center line of the toe of the shoe so that as the shoe passes through the machine said roller will contact with the toe portion of the foxing on the right-hand portion thereof, and as the shoe progresses said arm 48 will swing so that the roller 47 will wipe around the toe portion from the right to the left-hand side thereof. This arm is also provided with a contact roller 50 similar to the roller 45 heretofore described on the arm 43. The roller 47 in the end of the swinging arm 48 is also preferably spool-shaped for the same purpose as the roller 44. I provide means whereby the foxing on the curved heel portion is rolled into place, which means will now be described: Rigid with the arm 43, heretofore described, and adapted to swing on the pivot 42 as a center, is an arm 51 pivotally connected as at 52 to one end of a link 53, the opposite end of which link is pivoted at 54 to the plunger rod 55, adapted to reciprocate in a bearing sleeve 56 mounted on the right-hand member of the machine frame. This bearing box is provided with a longitudinal slot 57, shown in dotted lines in Fig. 20, through which the pivot pin 54 for the end of the link projects, the arrangement being such that when the shoe engages the roller 44 on the arm 43 and the latter is swung in the direction of the arrow, as described, the plunger arm 55 will be withdrawn within the bearing sleeve 56 out of the path of the toe portion of the shoe and held back until the heel portion of the foxing is adjacent the inner end of said plunger rod, and after the toe roller 44 has moved out of engagement with the heel portion of the shoe.

The bearing box 56 is adjustably mounted so that elevation of the roller may be regulated, an adjustable joint being provided between the bearing box and the main frame for this purpose, said joint including a clamping bolt 57ª adapted to clamp the box in the desired position. The adjustable joint is carried on a plate 58 rotatably mounted on the frame and adapted to be clamped in the desired position thereon by a pivot bolt 59 so that the bearing box may be adjusted in a horizontal plane. At its inner end the arm 55 carries a yoke 60 having an adjustable, pivotal connection 61 thereto, and having journaled in this arm a cylindrical roller 62 inclined at the proper axis to cause the roller to properly contact with the entire surface of the heel foxing. The pivotal connection 61 between the yoke 60 and the arm 55 may consist of a clamping bolt, which permits of the yoke being swung to the desired position and then clamped to the arm.

The roller 62 is adapted to roll the heel foxing at the extreme right of the foxing to a point to the left of the center line of the last, and on the opposite side of the machine I provide in connection with the roller 47 a similar roller arrangement to that just described for rolling the heel foxing from the extreme left-hand portion thereof to a point to the right of the center of the last, so that the entire heel foxing is rolled from end to end, and that the extreme rear portion is subjected to a double rolling action at a point where it is particularly desirable to form a secure joint.

Between the heel-rolling rollers 62, 63, I provide a counter-balancing roller 64 mounted on an arm 65 reciprocating in a bearing sleeve 66 and adapted to rest by gravity under influence of the weights 67 upon the shoe so that any tendency of the roller 63 to cant the shoe to one side will be opposed. Such a counter-balancing roller is not necessary for the forward heel roller 60 as its tendency to cant the shoe is opposed by the second toe roller 47 and the second heel roller 63. The sleeve for the plunger of the rollers 64 may be mounted for adjustment in the same manner as the sleeves of the foxing rollers, and the roller 47, see Fig. 6.

The plunger bars 55, 55', carrying the heel foxing rollers 62, 63, are normally urged forward into engaging position with the shoe by any suitable means, but I preferably employ a weight 68 carried by a flexible strap 69 passing over a roller 70 journaled in brackets 71 at the rear end of the bearing sleeve and connected to a hook 72, or other suitable device on the rear ends of the plunger bars. It will be understood that the bearing sleeves for the heel roller arms and the counter-balancing arms are preferably provided with anti-friction rollers such as illustrated in Figs. 17, 18 and 19.

After passing the toe and heel foxing rollers just described, the last with the shoe thereon is removed from the conveyer and the outer or finishing sole, previously supplied on its inner surface with the proper cement, is applied in position over the outer filler and so as to overlap the heel and toe foxing. The last is then mounted on the carrier and is carried to mechanisms which operate to roll the sole down firmly into position and to roll the edges of the sole into close contact with the lower edges of the foxing. This means may take a variety of forms, but I prefer to employ a set of rollers similar to that first described, that is, the set A, for rolling the sole into place, said set of rollers being indicated generally at D. I do not deem it necessary to repeat the description of this set of rollers as it will be perfectly clear from the description of the set A previously described. After leaving this set of rollers D it passes to a set of rollers E, similar to the set C, for rolling the foxings into place, and this set of rollers E may be of the same construction as the foxing rollers with slight variations, which I have adopted in order to more perfectly unite the sole with the foxing. In both sets C, E, of rollers the roll-bearing plunger bars may be in two parts (see Fig. 33), 73, 74, one having a socket 75 to receive a cylindrical shank or pin 76 carried by the yoke-bearing part of said bar, so that said yoke may be rotated relative to the body of the bar to change the inclination of the axes of rotation of the rollers lengthwise of the machine, that is, so that the inclination of the axes may not only be transverse of the machine, but may be also lengthwise of the machine. The shank 76 is held in place by a suitable set-screw 78 extending through the socket portion of the bar and engaging said shank. In this set of rollers E, I preferably adjust the yokes of the rollers so that the axes of rotation of the rollers will incline upwardly longitudinally of the machine in the direction of travel of the last, whereby a wiping action, as well as a rolling action, of the rollers on the edges of the sole is effected, thereby causing close contact between the edges of the sole and the foxing. In order that the toe and heel portions of the sole edges will be rolled into proper engagement with the toe and heel foxing, I provide a mechanism F, comprising a set of rollers 79, 80, 81, 82, similar to that heretofore described for rolling the toe and heel foxings into place, the only difference being that cylindrical rollers are employed instead of the spool-shaped rollers heretofore described. In this last set of rollers the axes of the heel-wiping rollers 81, 82, are also inclined upwardly and longitudinally of the direction of travel of the last so that the proper wiping action is had upon the toe and heel portions of the sole.

This roller arrangement F is illustrated in Fig. 21. In this form I have shown a modified arrangement of the rollers for engaging the toe over that shown in Fig. 20, both toe-foxing rollers being mounted on arms 83 of a single bracket 83', bolted to the end of the swinging arms, said bracket arms 83 being mounted on adjustable pivots consisting of clamping bolts, as at 84, so that the axes of the rollers may be adjusted relative to the vertical lengthwise of the machine, and the bracket adjustably mounted on clamping bolts, as at 85, whereby the axes may be adjusted relative to the vertical transversely of the machine. In this arrangement it will be understood that the heel and toe rollers are adjusted and controlled in substantially the same manner as that heretofore described for the set of rollers for rolling the toe and heel foxings, so that I do not deem it necessary to repeat that description here.

In the last arrangement of rollers I show a little different arrangement of the counter-balancing rollers for the last, although the arrangement heretofore described may be used if desired. In this form a counter-balancing roller 86 is mounted on a bracket 87 on the left-hand frame member 3 to oppose the action of the first set of toe rollers, and at a point between the two heel rollers I provide a counter-balancing roller 88 mounted on a bar 89 arranged in a bearing box 90, the same as heretofore described, inclined longitudinally and adapted to have its inclination adjusted to suit conditions as heretofore set forth. Upon passing the last set of rollers for rolling the toe and heel edges of the sole in place, the shoe is completed as far as the structure thereof is concerned and is ready to be finished in any suitable manner for commercial purposes, such as varnishing, stitch-marking along the sole, &c., which are operations carried on by hand or machine.

I may provide any suitable form of conveyer for carrying the last progressively through the successive mechanisms, and I will now describe a form of conveyer which I have adopted as a preferable form, and which has proved satisfactory in actual practice. The frame standard members 1 are provided at a point below the side members 3, 4, with upper transverse members 2, and lower transverse members 92, the former extending entirely across the standard, and the latter having their ends separated from each other, as clearly shown in Fig. 9. Passing over the upper members 2, and over the lower members 92 are the upper and lower runs, respectively, of an endless sprocket chain 93, the ends of which are respectively mounted upon sprocket wheels 94, 95, mounted at the opposite ends of the machine frame. The sprocket wheel 94 is mounted in a block 96 slidably mounted in suitable guides 97 extending lengthwise of the machine and adapted to be adjusted by a screw shaft 98 so that the proper tension in the chain may be maintained. The other sprocket wheel 95 is adapted to be driven by a suitable worm gear (not shown) inclosed in a casing 99 and driven from a suitable source of power, preferably an electric motor 100. The worm gear is connected to the shaft carrying the sprocket 95 to drive the same by a suitable clutch, indicated generally at 101, so that the chain may be connected and disconnected from its driving means. The clutch 101 is operable by operating shafts 102 extending lengthwise of the machine and operable by treadles 103, so located that the chain may be stopped should any operator working along the machine find it necessary, without the necessity of going to an isolated clutch-operating means or motor-controlling means. The treadles are returned to position by a spring (not shown) in the clutch, or other suitable means.

I do not desire to limit myself to any particular form of a chain or conveyer as there are many known forms which would serve my purpose.

Upon this chain I provide suitable means for supporting the lasts to properly present them to the rolling mechanisms as the chain progresses, which means I will now describe: 104 designates a rectangular supporting base or frame, preferably in the form of a casting having a cross-member 105 which is adapted to be secured to an attachment link 106 of the chain as shown in Figs. 22 and 23. At its front end and cast integrally with the base 104 is a vertically extending toe rest 106' having at its base an undercut recess 107 for a purpose to be presently described, and at the rear of said base and integral therewith is an abutment 108 through which extends an adjusting or clamping screw 109. The construction just described constitutes a car or rest for a last support which will now be described, and which is adapted to support the well known forms of lasts used in rubber shoe manufacture so that the well known forms of lasts may be used on this machine without alteration. The form of support adapted to support lasts for making the well known forms of arctics consists of a base 110 adapted to be supported on the base 104, heretofore described, and having a projection 111 at its forward end adapted to be received in the locking recess 107 at the base of the toe support 106', the length of the base of the support being such that the set-screw 109, heretofore described, may be projected over the rear end of said base 110 to thereby lock the last support in position. In order to prevent lateral displacement of the support from the carrier or car, I form the latter with a recessed seat 112, in which the base of the last support is adapted to be seated, as clearly shown in Fig. 22. Rising from the central portion of the base 110 of the last support is a pillar 113 formed in its upper central portion with recesses 114 to receive last supporting pins 115, adapted to be removably secured in place by set-screws 116, said pins being adapted to enter the usual holes in the top of the last whereby the latter is secured to the support. I do not desire to be limited to the specific construction described for connecting the last to its support as any means which will efficiently perform the function may be employed.

In Figs. 28 and 29 I have shown a form of the support for lasts for gaiter forms of over-shoes. The carriage on the conveyer may be the same as heretofore described, but the support instead of being provided with the standard and last attaching means shown in Figs. 25, 26 and 27, is provided at its rear portion with an upwardly and forwardly extending arm 117 having a forked upper end 118, the arms of which extend horizontally in the direction of travel of the conveyer, said arms being adapted to receive between them the last at a point below the sole thereof, so that the arms of the yoke will not interfere with the rollers in passing through the machine. As the last for gaiters is considerably longer than that for ordinary arctics, I mount the supporting pins 119, or other attaching means, at the base of said arm 117 and substantially on the supporting plate 110'. These pins may also be held in place by set-screws 120 as shown in Fig. 28. The supporting arm 117 serves to maintain the last or form vertical, and relieves the pins of strain due to blows or pressure on the form as it progresses through the machine.

In order to insure the last traveling in a straight line through the machine, I provide on the upper frame member 91 facing channel irons 121 to receive the side edges of the base plates 104 of the carriages, and also provide similar channel irons or angle irons 122 on the upper ends of the arms 92 for the same purpose.

I may, if desired, associate with the machine a suitable device for marking the sizes, or other markings, on the soles or the shanks of the soles, as the shoes pass through the machine. This means is shown in detail in Figs. 30, 31 and 32, and its location in the complete machine is shown in Figs. 3 and 7, just before the lasts pass to the outer sole-applying rollers. This means consists of vertical spaced standards 123 mounted on the upper side frames of the machine on opposite sides of the conveyer passage and having guide grooves 124 facing each other, in which is mounted a vertically sliding frame 125, preferably carrying antifriction rollers 126 traveling in said guide grooves. This frame carries at its lower portion a horizontally disposed roller 127, which is adapted to travel on the sole of the shoe as the latter progresses through the machine. At a point above the roller 127, and on the forward side of the frame are brackets 128, in which are pivoted bearing arms 129 which extend over the frame and then down to a point just below the top of the said roller 127, said arms carrying in their lower ends a marking roller 130 journaled in bearings 131 on the lower ends of said arms 129. This roller 130 carries any suitable marking device, 132, and is preferably journaled off its center, as clearly shown in Fig. 32, so that it will automatically rotate to present the marking device normally on its under surface in position to engage the sole of the shoe. The operation of this marking device is as follows: As the shoe passes through the machine the toe passes under the roller 127 and thereby lifts the frame 125, raising with it the arms 129 and marking roller 130. As the shoe progresses the roller 127 rides up on the heel of the shoe, the frame thereby being lifted with the marking roller, and as soon as the heel of the shoe passes the roller 127 the frame gravitates to cause the marking device to strike somewhere in the shank of the shoe. It will be understood that the distance between the roller 127 and the marking device 132 is so adjusted that when the roller 127 drops off the heel of the shoe the marking roller will be in proper position to strike the shank, or other part of the sole, upon which it may be desired to apply the mark. I have shown it in the present instance as being adjusted to strike the shank, although I do not desire to be limited to any such exact arrangement of parts. It will be understood that the marking device is removable from the roller 130, so that it may be changed at will. It may be secured in place by a set screw 133, if desired.

Supported by the upper side rails 3, 4 of the machine frame are tables 134 or work benches, upon which the operatives may perform the operations of applying the parts or layers to the last in making up the shoe.

In view of the fact that the function and operation of the machine has been explained above as the detailed description of the construction has progressed, I do not deem it necessary to repeat the operation as I believe it will be clear from the said detailed description.

While I have shown herein and described, an endless conveyer for presenting the shoes, while being made, to the several mechanisms, I desire it understood that I do not desire to be limited to an endless conveyer, and that the term "conveyer" as used in the claims is intended to include broadly means for presenting the form to the rolls and moving the same relative thereto.

I provide means for automatically stopping the travel of the conveyer, should the operator for any reason fail to remove a shoe from the form before the form reaches the end of the machine to travel over the sprocket wheel 95, the purpose being to prevent injury to the machinery or the shoe, should the form be carried over said sprocket wheel to the lower end of the conveyer. This means may take a number of forms, but I prefer to operate a cutout for the current to the motor 100. The particular means shown, to which I do not desire to be limited, consists of a bell crank lever fulcrumed as at 135 (see Fig. 35) on the left-hand side rail of the machine, one arm 136 of said lever projecting into the path of movement of the form and carrying a contact roller 137 adapted to be engaged by the form during the travel of the conveyer. The opposite arm 138 of the bell crank lever lies over the left-hand side rail of the frame and has connected to its free end a flexible connection 139 traveling over a sheave 140 and carrying at its lower end a tension device which operates to throw the bell crank lever so as to maintain the roller 137 normally in the path of movement of the form. Connected at one end to the arm 136 is a flexible connection 142, the opposite end of which runs over a sheave 143 on the side frame and carries at its lower end a weight 144 to maintain proper tension in said flexible connection 142. At a point intermediate its ends the connection 142 engages the magnet-operated arm 145 of a magnetic cutout, the arrangement being such that, should a form engage the roller 137, it will draw the connection 142 taut and raise the lever into the field of the magnet, which, being normally energized, will attract said arm and release the pawl or catch 146, which locks the switch arm 147 in engagement with the contacts 148 to maintain current through the motor. The cutout is of a well-known form and, therefore, need not be described with any further particularity by me, as it specifically constitutes no part of my present invention except in so far as it may enter into combination with the stop device.

I may also employ the same stop device in connection with each of the mechanisms for operating on the shoe in order to stop the travel of the conveyer, should the operator fail to seat the last properly upon the conveyer. In this arrangement I would employ substantially the same construction as that just described except that the roller 137 is arranged in position to be engaged by the side of the form, should the latter not be pushed down far enough on the conveyer so that the travel of the conveyer would be stopped before the last improperly placed on the conveyer could reach the next mechanism.

What I claim and desire to secure by Letters Patent of the United States is:

1. A machine of the class described embodying means for holding a shoe, and a series of rollers graduated in width and each adapted to roll a greater area down the center of the sole than the next preceding roller.

2. A machine of the class described comprising means for holding a shoe, a primary roller arranged to contact with the longitudinal central portion of the sole of the shoe, and a second roller of greater width than the primary roller arranged to follow and roll a greater area down the center of the sole than the primary roller.

3. A machine for forming rubber shoes, comprising a sole roller, a toe roller for rolling the toe above the sole, and a heel roller for rolling the heel above the sole, and means common to all of said rollers for presenting a form upon which the shoe is built up to said rollers successively.

4. A machine for forming rubber shoes, comprising an endless conveyer adapted to carry a shoe form upon which the shoe is built up with the sole of the form uppermost, sole edge rolling means, toe rolling means for rolling the toe above the sole, heel rolling means for rolling the heel above the sole, and sole rolling means to which the form is presented by said conveyer, all of said means being mounted above said conveyer and acting toward the same, and means for supporting the conveyer in opposition to the pressure of the rollers on the form.

5. A machine for forming rubber shoes, comprising an endless conveyer having means to support a shoe form with the sole outermost, and means for uniting shoe parts assembled on the form, said means comprising rollers rotatable on an axis parallel to the plane of movement of the conveyer, rollers rotatable on axes transverse of and inclined in the direction of travel of the conveyer, rollers rotatable on axes inclined upwardly transversely of the conveyer and in the direction of travel of the latter, and rollers rotatable on axes substantially at right angles to the direction of movement of the conveyer, and means to cause the conveyer to travel in a straight path, and supported rigidly in opposition to the pressure of the rollers on the form.

6. In a machine for forming rubber shoes, a conveyer adapted to support a shoe form with the sole uppermost, and a sole rolling means comprising a plurality of rollers of different widths arranged in sequence, and arranged to roll paths of different widths down the longitudinal central portion of the sole of the form.

7. In a machine for forming rubber shoes, a conveyer adapted to support a shoe form with the sole uppermost, and a roller mechanism comprising a plurality of rollers arranged in sequence and increasing in width from the first to the last roller in sequence, and each adapted to roll a greater area down the center of the sole than the next preceding roller.

8. In a machine for forming rubber footwear, a conveyer adapted to support a shoe form with the sole uppermost, a plurality of vertically movable frames arranged over the conveyer to move freely toward and away from the form, rollers graduated in width and journaled in said frames, guide members in which said frames move, and means for adjusting said guide members relative to the path of movement of the conveyer.

9. In a machine for forming rubber footwear, a conveyer adapted to support a shoe form with the sole uppermost, a plurality of vertically movable frames arranged over the conveyer, rollers graduated in width and journaled in said frames, and means for limiting the movement of said frames toward the conveyer.

10. In a machine for forming rubber footwear, a conveyer adapted to support a shoe form with the sole uppermost, a plurality of frames arranged over the conveyer, sole rollers graduated in width and journaled in the frames, guides for the frames, a support common to all of the guides, and means for adjusting said support to regulate the movement of the frames relative to the conveyer.

11. In a machine for forming rubber shoes, a conveyer adapted to support a shoe form with the sole uppermost, a plurality of frames arranged above the conveyer, rollers graduated in width and journaled in said frames and adapted to engage the sole of a shoe, vertical channel members, and guide rollers on said frames engaging the channel members to guide the vertical movement of said frames.

12. In a machine for forming rubber shoes, a conveyer adapted to support a shoe form with the sole uppermost, a plurality of frames arranged above the conveyer, rollers graduated in width and journaled in said frames and adapted to engage the sole of a shoe, vertical channel members, guide rollers on said frames engaging the channel members to guide the vertical movement of said frames, and stops on the channel members to limit movement of the frames toward the conveyer.

13. In a machine for forming rubber shoes, a conveyer adapted to support a shoe form with the sole uppermost, a plurality of horizontally disposed sole rollers graduated in width and arranged over the conveyer and adapted to engage the sole of the form, and a plurality of inclined rollers adapted to roll the edge portions of the sole.

14. In a machine for forming rubber shoes, a conveyer adapted to support a shoe form with the sole uppermost, a plurality of horizontally disposed sole rollers graduated in width and arranged over the conveyer and adapted to engage the sole of the form, a plurality of inclined rollers adapted to roll the edge portions of the sole, and means for yieldingly supporting said rollers to give them free movement toward and away from the frame.

15. In a machine for forming rubber shoes, a conveyer adapted to support a shoe form with the sole uppermost, sole rollers graduated in width and arranged over the conveyer and adapted to engage the sole, and an inclined roller adapted to roll the edge portions of the sole.

16. In a machine for forming rubber shoes, a conveyer adapted to support a shoe form with the sole uppermost, rollers graduated in width and arranged over the conveyer and adapted to engage the sole, and a plurality of inclined rollers arranged on axes of increasing inclination and adapted to roll the edge portions of the sole.

17. In a machine for forming rubber shoes, a conveyer adapted to support a shoe form with the sole uppermost, a plurality of vertically movable frames arranged over the conveyer, rollers journaled in said frames and adapted to engage the sole of a shoe, supports for the ends of said frames, and means for simultaneously adjusting said supports relative to the conveyer.

18. In a machine for forming rubber shoes, a conveyer adapted to support a shoe form with the sole uppermost, a plurality of vertically movable frames arranged over the conveyer, supports for the ends of the frames, rollers journaled in said frames and adapted to engage the sole of a shoe, threaded standards upon which said supports are mounted, and means for simultaneously rotating said standards to adjust the supports.

19. In a machine for forming rubber shoes, a conveyer adapted to support a shoe form with the sole uppermost, a plurality of vertically movable frames arranged over the conveyer, supports for the ends of the frames, rollers journaled in said frames and adapted to engage the sole of a shoe, threaded standards upon which said supports are mounted, and means for simultaneously rotating said standards to adjust the supports, said means consisting of sprocket wheels on the supports, and an endless sprocket chain engaging said sprocket wheels.

20. In a machine for forming rubber shoes, comprising horizontally disposed rollers graduated in width, means for passing a shoe form with the central portion of the sole thereof in contact with said rollers, and oppositely inclined rollers in rear of the first-named rollers and adapted to roll the shoe sole on the opposite sides of said central portion.

21. A machine for forming rubber shoes comprising roller means graduated in width, an endless conveyer movable relative to said means, said conveyer having means for supporting the shoe form and the sole thereof toward said roller means, and means for rigidly supporting the conveyer during its travel.

22. A machine for forming rubber shoes comprising roller means graduated in width, an endless conveyer movable relative to said means, said conveyer having means for supporting the shoe form and the sole thereof toward said roller means, and means for rigidly supporting the conveyer during its travel, said means consisting of rigid guide members guiding the side edges of the conveyer.

In testimony whereof I have hereunto signed my name in the presence of two subscribing witnesses.

MYRON H. CLARK.

Witnesses:
M. E. McNINCH,
C. G. WEYLMEIR.